United States Patent
Du et al.

(10) Patent No.: US 11,984,577 B2
(45) Date of Patent: May 14, 2024

(54) METHOD OF SOLVENT-FREE MANUFACTURING OF COMPOSITE ELECTRODES INCORPORATING RADIATION CURABLE BINDERS

(71) Applicant: UT-BATTELLE, LLC, Oak Ridge, TN (US)

(72) Inventors: Zhijia Du, Knoxville, TN (US);
Christopher James Janke, Oliver Springs, TN (US); Jianlin Li, Knoxville, TN (US); David L. Wood, III, Knoxville, TN (US); Claus Daniel, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/707,563

(22) Filed: Mar. 29, 2022

(65) Prior Publication Data

US 2022/0216454 A1    Jul. 7, 2022

Related U.S. Application Data

(63) Continuation of application No. 15/966,840, filed on Apr. 30, 2018, now Pat. No. 11,289,689.
(Continued)

(51) Int. Cl.
*H01M 4/04* (2006.01)
*H01M 4/02* (2006.01)
(Continued)

(52) U.S. Cl.
CPC ....... *H01M 4/0419* (2013.01); *H01M 4/0404* (2013.01); *H01M 4/0435* (2013.01);
(Continued)

(58) Field of Classification Search
CPC .. H01M 4/621; H01M 4/0404; H01M 4/1397; H01M 4/1393; H01M 4/1391;
(Continued)

(56) References Cited

U.S. PATENT DOCUMENTS 5,726,216 A   3/1998 Janke et al.
5,877,229 A   3/1999 Janke et al.
(Continued)

OTHER PUBLICATIONS

Kim et al. (WO 2006107157 Al) (a raw machine translation) (Abstract) (Oct. 12, 2006) (Year: 2006).*
(Continued)

*Primary Examiner* — Sarah A. Slifka
(74) *Attorney, Agent, or Firm* — Fox Rothschild LLP

(57) ABSTRACT

A method of making an electrode includes the step of mixing active material particles, radiation curable resin precursors, and electrically conductive particles to create an electrode precursor mixture. The electrode precursor mixture is electrostatically sprayed onto a current collector to provide an electrode preform. The electrode preform is heated and calendered to melt the resin precursor such that the resin precursor surrounds the active particles and electrically conductive particles. Radiation is applied to the electrode preform sufficient to cure the radiation curable resin precursors into resin.

16 Claims, 10 Drawing Sheets

Related U.S. Application Data

(60) Provisional application No. 62/492,370, filed on May 1, 2017.

(51) Int. Cl.
  *H01M 4/1315* (2010.01)
  *H01M 4/1391* (2010.01)
  *H01M 4/13915* (2010.01)
  *H01M 4/1393* (2010.01)
  *H01M 4/1397* (2010.01)
  *H01M 4/62* (2006.01)

(52) U.S. Cl.
  CPC ....... *H01M 4/0471* (2013.01); *H01M 4/1315* (2013.01); *H01M 4/1391* (2013.01); *H01M 4/13915* (2013.01); *H01M 4/1393* (2013.01); *H01M 4/1397* (2013.01); *H01M 4/621* (2013.01); *H01M 2004/028* (2013.01)

(58) Field of Classification Search
  CPC ............. H01M 4/1315; H01M 4/0435; H01M 4/0471; H01M 4/13915; H01M 4/0419
  See application file for complete search history.

(56) References Cited

U.S. PATENT DOCUMENTS

| | | | | |
|---|---|---|---|---|
| 2003/0087152 A1* | 5/2003 | Shindo | ................ | H01M 4/0404 252/182.1 |
| 2007/0202403 A1* | 8/2007 | Oh | ........................ | H01M 4/621 252/511 |
| 2011/0081575 A1* | 4/2011 | Voelker | ................. | H01M 4/139 427/508 |
| 2012/0258359 A1* | 10/2012 | Saka | ....................... | C01B 25/45 429/211 |
| 2014/0030590 A1 | 1/2014 | Wang et al. | | |
| 2014/0245599 A1 | 9/2014 | Voelker et al. | | |
| 2014/0342223 A1 | 11/2014 | Voelker et al. | | |
| 2016/0164098 A1* | 6/2016 | Ozeki | ..................... | H01M 4/62 429/127 |
| 2018/0053944 A1 | 2/2018 | Johnston et al. | | |

OTHER PUBLICATIONS

Kim et al. (WO 2006107157 Al) (a raw machine translation) (Detailed Description) (Oct. 12, 2006) (Year: 2006).*

H. Abe et al.: "Electrostatic Spray Deposition for Fabrication of Li-ion Batteries", Transaction of JWRI, 44, 9 (2015).

B. Ludwig, et al.:0"Solvent-Free Manufacturing of Electrodes for Lithiumion Batteries" Scientific reports, 6, 23150 (2016).

Z. Du et al.: "Electron beam curing of composite positive electrode for Li-ion battery", J. Electrochem. Soc., 163 (13) A2776 (2016).

Ahmed, et al.: " Energy impact of cathode drying and solvent recovery during lithiumion battery manufacturing" Journal of Power Sources, vol. 322 (2016) p. 169-178.

John Arnold: "UV Curable Binder Technology to Reduce Manufacturing Cost and Improve Performance of LIB Electrodes", Miltec UV International, UV Processing Reduces Electrode and Ceramic Coated Separator Costs; Jun. 9, 2016.

* cited by examiner

METHOD OF SOLVENT-FREE MANUFACTURING OF COMPOSITE ELECTRODES INCORPORATING RADIATION CURABLE BINDERS

CROSS-REFERENCE TO RELATED APPLICATIONS

This application is a continuation of U.S. patent application Ser. No. 15/966,840 filed Apr. 30, 2018, which claims priority to U.S. Provisional Patent Application No. 62/492,370 filed on May 1, 2017, entitled "A Method of Solvent-Free Manufacturing of Composite Electrode Incorporating Radiation Curable Binders", the entire disclosures of which are incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

This invention relates generally to electrodes for electrochemical devices, and more particularly to methods for making electrodes for electrochemical devices.

BACKGROUND OF THE INVENTION

Electrochemical energy storage and conversion devices including batteries, capacitors and fuel cells have been found to possess great utility as power sources for portable electronics, energy storage stations and electric vehicles. For example, the Li-ion battery is one of the devices which have high energy/power density. The battery includes positive electrodes and negative electrodes that are electrically insulated by a porous separator. Electrolyte is filled in the pores of the electrodes and separators to ionically connect the two electrodes. The positive electrode and negative electrode are composed of lithium active solid particles which are held to a thin metal sheet by binders. The thin metal sheet is called a current collector. The binder is typically a polymer that provides adhesion of the solid particles to each other and to the current collector.

Conventionally, the electrode is manufactured via a slurry casting and subsequent thermal drying and/or radiation curing process. The solid particles and binder are dispersed into a solvent such as water, N-Methyl-2-pyrrolidone (NMP), and Isopropyl Alcohol (IPA) to form a semiliquid mixture called a slurry. The coating is produced by applying the slurry onto a current collector and drying out the solvent. The evaporation of the solvent involves high energy input and is a time limiting factor. If a volatile organic compound (VOC) is used, a recycling system has to be installed to limit emissions of the VOCs, which requires more capital investment and more energy. The highest solid loading in aqueous slurry is up to 80 wt %. Thermal drying is still required, which consume energy/capital cost and limit manufacturing speed. Solvent-free manufacturing therefore needs to be developed. The conventional binder system is a high molecular weight (MW) polymer that provides cohesion to the active materials and to other materials and adhesion to the current collector. The polymer is usually linear (straight-chain).

SUMMARY OF THE INVENTION

A method of making an electrode includes the step of mixing active material particles, radiation curable resin precursors, and electrically conductive particles to create an electrode precursor mixture. The electrode precursor mixture is electrostatically sprayed onto a current collector to provide an electrode preform. The electrode preform is calendered such that the radiation curable precursors surround the individual active particles and carbon black particles. Radiation is applied to the electrode preform sufficient to cure the radiation curable resin precursors into resin.

The method can also include the step of heating the electrode preform, either before or after calendering. The heating step can melt the radiation curable precursors such that the radiation curable precursors surround the individual active particles and carbon black particles. The heating and calendering can be performed in the same step.

The radiation can be electron beam radiation. The electron beam radiation can have an energy greater than 200 keV. The radiation can be ultraviolet radiation. The ultraviolet radiation can be at least one selected from the group consisting of UV-C, UV-B, UV-A and UV-V.

The radiation curable resin precursors can comprise at least one selected from the group consisting of monomers and oligomers. The radiation curable precursors can comprise at least one selected from the group consisting of precursors that cure via free radical mechanism and cationic mechanism. The resin precursors that cure via free radical mechanism can comprise at least one selected from the group consisting of vinyl unsaturation and acrylate groups. The resin precursors that cure via cationic mechanism can comprise epoxide groups.

The electrically conductive particles can comprise at least one selected from the group consisting of carbon black, graphene, and carbon nanotubes.

The active material particles can be cathode active materials. The cathode materials can comprise at least one selected from the group consisting of $LiCoO_2$, $LiNiO_2$, $LiMnO_2$, $LiMn_2O_4$, $LiFePO_4$, $LiMnPO_4$, $LiFe_xMn_{1-x}PO_4$, $LiNi_xMn_yCo_{1-x-y}O_2$, $Li_{1+x}Ni_yMn_2Co_{1-x-y-z}O_2$, $LiNi_xMn_y Co_zAl_{1-x-y-z}O_2$, $Li_{1+x}Ni_yMn_{1-x}Co_2O_2$, and $Cu_2ZnSn(S,Se)_4$. The active material particles can be anode active materials. The anode active materials can comprise at least one selected from the group consisting of graphite, silicon, hard carbon and $Li_4Ti_5O_{12}$.

A system for making a battery includes an electrospray apparatus having a first electrode with a first polarity. A retaining apparatus for a current collector has a second electrode with a polarity opposite to the polarity of the first electrode. An electrode material source is provided for suppling a homogeneous mixture of active material particles, electrically conductive particles, and radiation curable resin precursors. The electrospray apparatus directs charged electrode material droplets to the current collector on the retaining apparatus to produce an electrode preform. A calender apparatus is provided for applying pressure and possibly also heat to the electrode preform. A radiation source supplies radiation to the electrode preform sufficient to cure the radiation curable resin precursors into a resin. A heating apparatus can be provided for heating the electrode preform. The calendering apparatus can be heated.

A method for making a battery can include the step of mixing active material particles, radiation curable resin precursors, and electrically conductive particles to create an electrode precursor mixture. The electrode precursor mixture is electrostatically sprayed onto a current collector to provide an electrode preform. The electrode preform is calendered such that the resin precursors surround the active particles and electrically conductive particles.

Radiation is applied to the electrode preform sufficient to cure the radiation curable resin precursors into resin and to provide a finished first electrode. A second electrode, a separator, and an electrolyte are provided. The first electrode, second electrode, separator, and electrolyte are assembled into a battery.

The method can further include the step of heating the electrode preform. The heating can comprise melting the radiation curable precursors such that the radiation curable precursors surround the individual active particles and carbon black particles. The heating and calendering can be performed in the same step.

BRIEF DESCRIPTION OF THE DRAWINGS

There are shown in the drawings embodiments that are presently preferred it being understood that the invention is not limited to the arrangements and instrumentalities shown, wherein:

FIG. 4A is a schematic diagram of a resin curing process before curing. FIG. 4B is a schematic diagram of a resin curing process after curing.

FIG. 5A is a schematic diagram before curing. FIG. 5B is a schematic diagram after curing.

DETAILED DESCRIPTION OF THE INVENTION

Figure 1:
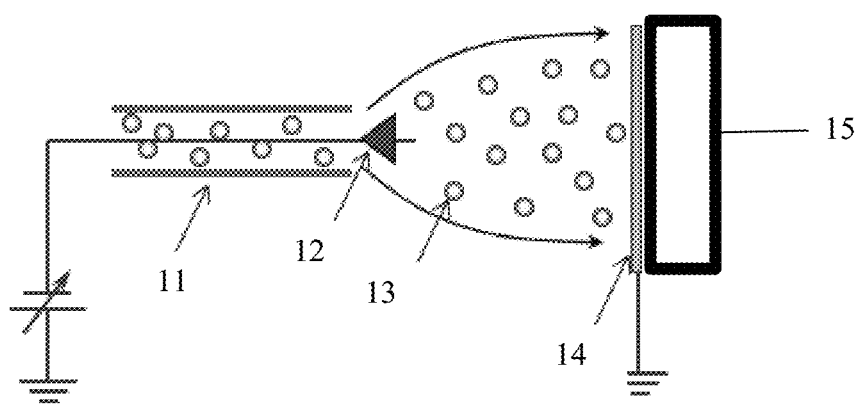
FIG. 1 is a schematic diagram of an electrospray apparatus as used in the present invention.

A method of making an electrode includes the steps of mixing active material particles, radiation curable resin precursors, and electrically conducting particles to create an electrode precursor mixture. The electrode precursor mixture is electrostatically sprayed onto a current collector to provide an electrode preform. The electrode preform is heated and calendered to melt the resin precursors such that the resin precursors surround the individual active particles and electronically conducting particles. Radiation is applied to the electrode preform sufficient to cure the radiation curable resin precursors into resin.

The radiation can be electron beam radiation. Any suitable electron beam machine can be used but the energy of the electron beam radiation must be sufficient to penetrate through the electrode material in order to fully cure the binder resin. The electron beam radiation must have sufficient energy. The energy of the electron beam can be ≥200 keV.

The electrically conducting particles can be any suitable electronically conducting particle that is stable under the intended operating conditions of the battery. The electronically conducting particles can be at least one selected from the group consisting of carbon black, graphene, and carbon nanotubes.

The radiation can be ultraviolet (UV) radiation. Any UV radiation source can be used in this application but the energy of the UV must be sufficient to penetrate through the electrode material in order to fully cure the radiation curable resin precursors. The ultraviolet radiation can be one or more of UV-C, UV-B, UV-A and UV-V radiation.

Radiation curable resin precursors can include radiation curable monomers and oligomers that cure via free radical mechanism or cationic mechanism. Resin precursors that cure via free radical mechanism include materials containing vinyl unsaturation or acrylate groups or other monomers and oligomers that contain free radical curable functional groups. Resin precursors that cure via cationic mechanism include materials containing epoxide groups or other monomers and oligomers that contain cationically curable functional groups.

The radiation curable resin precursors comprise at least one selected from the group consisting of an epoxy resin and a cationic photoinitiator. The epoxy resin is selected from the group consisting of: glycidyl ethers of bisphenol A, epoxy phenolic novolacs, epoxy cresol novolacs, bisphenol F epoxies, tetraglycidyl ether of tetrakis (4-hydroxyphenyl) ethane, diglycidyl ether of 9,9-bis (4-hydroxyphenyl) fluorene, glycidyl ether of the condensation product of dicyclopentadiene and phenol, triglycidyl ether of tris (hydroxyphenyl) methane, 3',4'-epoxycyclohexylmethyl 3,4-epoxycyclohexanecarboxylate, diglycidylester of hexahydrophthalic anhydride, bis (3,4-epoxycyclohexylmethyl) adipate, isomeric mixture of bis (2,3-epoxycyclopentyl) ether, isomeric mixture of bis (2,3-epoxycyclopentyl) ether reacted with ethylene glycol, isomeric mixture of bis (2,3-epoxycyclopentyl) ether blended with a bisphenol A based glycidyl ether, and mixtures thereof. The cationic photoinitiator is selected from the group consisting of: diaryliodonium salts, triarylsulfonium salts, and mixtures thereof. The diaryliodonium salts have the following formula:

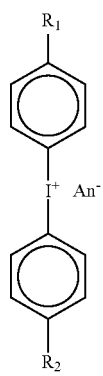

where $R_3$ is selected from the group consisting of: H, methyl, ethyl, n-propyl, isopropyl, n-butyl, tert-butyl, phenylsulfide (PhS), phenoxy (PhO), and mixtures thereof. An⁻ is an anion selected from the group consisting of: hexafluoroarsenate ($AsF_6^-$), hexafluoroantimonate ($SbF_6^-$), hexafluorophosphate ($PF_6^-$), boron tetrafluoride ($BF_4^-$), trifluoromethane sulfonate ($CF_3SO_3^-$), and tetrakis (pentafluorophenylborate) ($[C_6F_5]_4^-$), and mixtures thereof.

The radiation curable resin precursor can comprise an epoxy resin monomer or mixtures of epoxy resins monomers (Part A), an initiator (Part B), and a toughener (Part C).

The epoxy resin monomer (Part A) may be virtually any of a variety of commercially available materials. The glycidyl ethers of various phenolic compounds are particularly important. These include the glycidyl ethers of bisphenol A as given by the following formula where n ranges from 0 to 12:

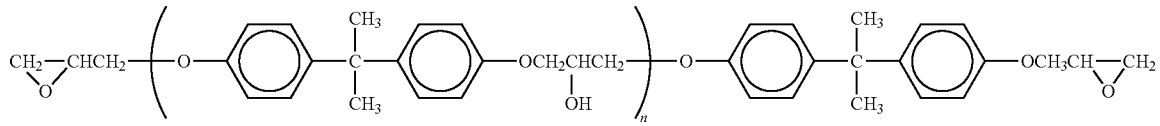

where $R_1$ and $R_2$ are selected from the group consisting of: methyl, ethyl, n-propyl, isopropyl, n-butyl, tertbutyl, Cl, Br, $OC_nH_{2n+1}$, $OCH_2CH(CH_3)C_nH_{2n+1}$, $OCH_2CH(C_2H_5)C_nH_{2n+1}$, $OCH_2CH(OH)$ $CnH_{2n+1}$, $OCH_2CO_2C_nH_{2n+1}$, $OCH(CH_3)CO_2C_nH_{2n+1}$, $OCH(C_2H_5)CO_2C_nH_{2n+1}$ and mixtures thereof where n is an integer between 0 and 18.

An⁻ is an anion selected from the group consisting of: hexafluoroarsenate ($AsF^-$), hexafluoroantimonate ($SbF^-$), hexafluorophosphate ($PF^-$), boron tetrafluoride ($BF_4^-$), trifluoromethane sulfonate ($CF_3SO_3^-$), and tetrakis (pentafluorophenylborate) ($B[C_6F_5]_4^-$), and mixtures thereof.

The triarylsulfonium salts have the following formulas:

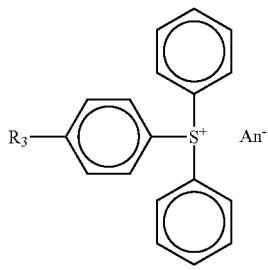

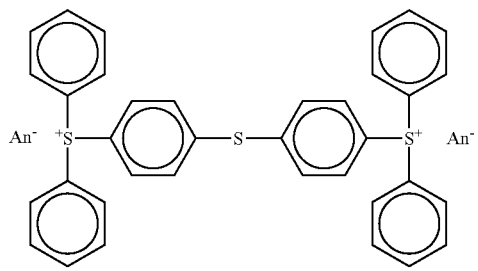

These resins are widely available from a number of manufacturers such as Shell Chemical Company, DOW Chemical Company. and Ciba-Geigy Corporation in a variety of molecular weights and viscosities. Examples include: D.E.R. 332, D.E.R. 330, D.E.R. 331. D.E.R. 383, D.E.R. 661, TACTIX 123, TACTIX 138, and TACTIX 177 (DOW trademarks); EPON 825, EPON 826 and EPON 828 (Shell trademarks); and, ARALDITE GY 6008, ARALDITE GY 6010. and ARALDITE GY2600 (Ciba-Geigy trademarks).

Additionally, flame retardant epoxy resins can be used including fluorinated or brominated bisphenol type epoxy resins such as D.E.R. 542 and D.E.R. 566-A80 from DOW Chemical Company.

Another important class of glycidyl ethers are those of phenolic novolac and cresol novolac resins as given by the following formula where n ranges from 0 to 8:

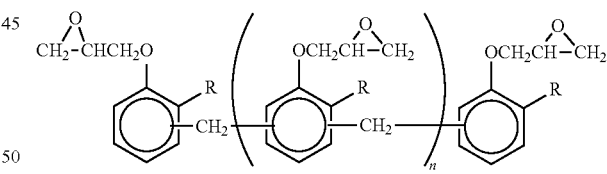

For epoxy phenolic novolacs, R=H, and for epoxy cresol novolacs. R=CH₃. For bisphenol F epoxy resins R=H and the value of n is low (0 to 0.15). These materials are also widely available from a number of manufacturers in a variety of molecular weights and viscosities. Examples include Epon 862, Epon 155, (Shell trademarks); D.E.R. 354, D.E.N. 431, D.E.N. 438, and D.E.N. 439 (DOW trademarks); and ARALDITE PY 306, ARALDITE EPN 1139, ARALDITE EPN 1138, ARALDITE GY 281, ARALDITE GY 285, ARALDITE GY 302-2, ARALDITE LY 9703, ARALDITE XD 4955, and ARALDITE ECN 9511 (Ciba-Geigy trademarks).

A similar epoxy that may also be used is SU-8 (Shell Trademark). Several other polyfunctional glycidyl ethers are of significant importance for high performance applications i.e. heavy mechanical loads under conditions of high temperature and harsh environment. The materials include:

The tetraglycidyl ether of tetrakis (4-hydroxyphenyl) ethane which is commercially available as EPON 1031 (Shell Chemical trademark) and ARALDITE MT 0163 (Ciba-Geigy trademark).

The diglycidyl ether of 9.9-bis (4-hydroxyphenyl) fluorene is commercially available as EPON HPT 1079 (Shell Chemical TRADEMARK).

Glycidyl ethers of the condensation product of dicyclopentadiene and phenol are available such as TACTIX 556 (DOW Chemical trademark) as given by the following formula where n is approximately 0.2:

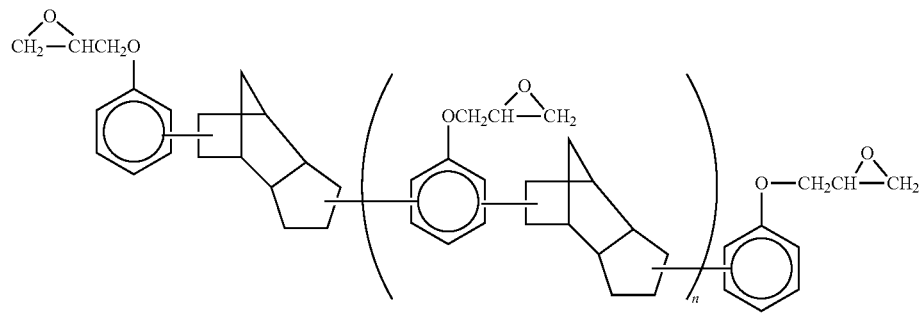

The triglycidyl ether of tris (hydroxyphenyl) methane, which is available as TACTIX 742 (DOW Chemical trademark) or as VD9053.

These latter materials, EPON 1031, EPON HPT 1079, TACTIX 556, TACTIX 742 and XD9053, are either high viscosity liquids or solids at room temperature. Therefore it is advantageous to blend these materials with a low viscosity bisphenol A or bisphenol F based diglycidyl ether or reactive diluents. The resulting blends are less viscous at ambient temperatures and are more easily processed. Some heating may be required for adequate flow, but the temperatures needed are not high enough to cause thermal curing of the epoxy group. Specific blends were found to have a good overall combination of low viscosity in the uncured state and high glass transition temperature flexural strength, and modulus when cured. It was found to be particularly advantageous to blend a high performance semi-solid epoxy such as TACTIX 556, TACTIX 742 or EPON HPT 1079, with a low viscosity bisphenol A or bisphenol F based glycidyl ether epoxy such as EPON 862, TACTIX 123, or a reactive diluent.

Cycloaliphatic epoxies represent another group of epoxies useful in the present invention. They are usually low viscosity liquids at room temperature and can either be used alone or as reactive diluents in blends with the semi-solid glycidyl ether epoxies. These materials include 3,4-epoxycyclohexylmethyl 3.4-epoxycyclohexanecarboxylate which is available as ERL-4221 (Union Carbide Corporation trademark) and ARALDITE CY-179 (Ciba-Geigy trademark); diglycidylester of hexahydrophthalic anhydride which is available as CY 184 (Ciba-Geigy trademark); bis (3,4-epoxycyclohexylmethyl) adipate, which is available as ERL-4299 (Union Carbide trademark); the isomeric mixture of bis (23-epoxycyclopentyl) ether which was once available as ERL-4205 (Union Carbide trademark); ERL-4205 reacted with ethylene glycol or blended with a bisphenol A based diglycidyl ether, which were once available from Union Carbide as ERLB-4617 and ERL-2258 (Union Carbide trademarks) respectively.

The epoxy resin monomer (Part A) as just described may also be advantageously modified by mixing it with various additives. Such additives include polyols such as ethylene glycol. propylene glycol 13-butylene glycol 1.4-butylene glycol, and other glycols. Aromatic diphenols and polyphenolic compounds may also be used to modify the epoxy resin. Other reactive diluents, which contain vinyl, acrylate, or methacrylate may be employed to change reactivity, glass transition temperature, or mechanical properties. In addition, reactive diluents based on monofunctional or polyfunctional glycidyl ethers may also be used to reduce the viscosity or modify the resin systems. Additionally, nonreactive diluents, such as acetone have been found to be useful for reducing the viscosity of the resin system which improves the processibility of the material before it is cured for certain applications, such as solvent based prepreg.

The initiator (Part B) for the present invention is a material which produces a positively charged species (cation) when subjected to ionizing radiation. This positively charged species must then be capable of initiating the cationic polymerization of the epoxy (Part A). Much research has been devoted to the development of cationic photoinitiators (J. V. Crivello *Advances in Polymer Science*. Vol. 62. p. 1. 1984). Cationic initiators react when subjected to visible or ultraviolet light of a particular wavelength to produce a cationic species typically a Bronsted acid. It was previously determined that some of these initiators also react to generate cations when subjected to ionizing radiation. The behavior of these materials when subjected to higher energy ionizing radiation, such as produced by an electron beam accelerator or a gamma cell, is difficult to predict. Diaryliodonium salts and triarylsulfonium salts of certain anions are particularly effective as initiators for the ionizing radiation induced cationic polymerization of epoxies. Many examples of each have been reported and some are commercially available. Almost all could be useful in the present invention.

Specific examples of diaryliodonium salts am given by the following formula, where $R_1$ and $R_2$ are radicals such as H, methyl, ethyl, n-propyl, isopropyl, n-butyl, tertbutyl Cl, Br, $C_nH_{2n+1}$, $OC_nH_{2n+1}$, $OCH_2CH(CH_3)C_nH_{2n+1}$, $OCH_2CH(C_2H_5)$ $C_nH_{2n+1}$, $OCH_2CH(OH)$ $C_nH_{2n+1}$, $OCH_2CO_2C_nH_{2n+1}$. $OCH(CH_3)CO_2C_nH_{2n+1}$, $OCH(C_2H_5)CO_2C_nH_{2n+1}$ and mixtures thereof where n is an integer between 0 and 18:

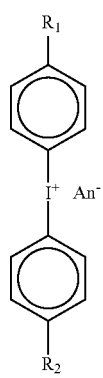

An⁻ denotes the anion which may be hexafluoroarsenate (AsF₆) hexafluoroantimonate (SbF₆), hexafluorophosphate (PF₆), boron tetrafluoride (BF4), trifluoromethane sulfonate (CF₃SO₃). tetrakis (pentafluorophenylborate), (B[C₆F₅J]₄), or tetrakis [3.5-bis(trifluoromethyl) phenyl] borate (B [C₆H₃ (CF₃)₂]₄). For example, OPPI in Tables 1-4 denotes (4-octyloxyphenyl) phenyliodonium hexafluoroantimonate (R₁=H₁, R₂=OC₈H₁₇ An⁻=SbF₆). This initiator, which was obtained from General Electric Corporation as Aryl Fluoroantimonate Product 479-2092 as well as another fluoroantimonate initiator. CD-1012 from the Sartomer Company ((4-(2-hydroxytetradecyloxy)phenyl phenyliodonium hexafluoroantimonate) were found to be particularly effective with certain epoxy resins. However, the present inventors have found that initiators with other R₁ and R₂ substituents would be expected to exhibit similar reactivities.

Specific examples of triarylsulfonium salts are given by the following formulas, where R₃ is H, methyl, ethyl, n-propyl, isopropyl, n-butyl, tert-butyl, phenylsulfide (PhS), phenoxy (PhO) and An⁻ denotes the anion, which may be the same as those of the diaryliodonium salts:

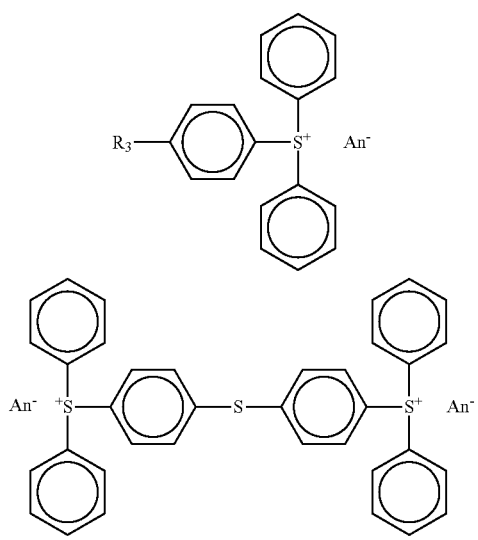

Examples of commercially available triarylsulfonium salts are CYRACURE UVI-6974 and CYRACURE UVI-6990 which are available from Union Carbide Corporation. These are mixtures of the triarylsulfonium salts given by the formula (V) and formula (VI) above where R₃ is phenyl-sulfide and An⁻ is are the hexafluoroantimonate and hexafluorophosphate anions, respectively. Degussa Corporation DEGACURE KI-85 and 3M Corporation FX-512 are both mixtures of triarylsulfonium hexafluorophosphate salts.

The toughener or flexibilizer (Part C) may be any of a variety of materials. High molecular weight engineering thermoplastics are particularly effective in increasing the toughness of the radiation cured epoxy mixture as measured by fracture toughness ($K_1$). Polysulfones such as UDEL and RADEL (Amoco Performance Products, Inc.) can be dissolved in the epoxy resin/initiator composition to form a viscous homogeneous mixture. Toughness of the cured composition is significantly improved in comparison with the untoughened epoxy resin (Examples 1 and 2, Table 1). Similar results were obtained with a polyetherimide such ULTEM (General Electric Company) as given by Example 3. It is not necessary for the thermoplastic to be miscible with the epoxy resin/initiator composition. The addition of Nylon 12 and Nylon 6/12 particles, ELF ATOCHEM ORGASOL 2001 and ORGASOL 3501, respectively, resulted in improved fracture toughness even though these materials were insoluble in the epoxy resin monomer mixture. Similar results were obtained using insoluble polyimide particles, IMITEC X-902. Other thermoplastics such as polyamideimides, poly(arylene ethers), polyesters. polyarylates, polycarbonates, polyurethanes, and others are potentially useful as Part C of the present invention. Examples can be found in "Engineering Plastics," D. C. Clagett, *Encyclopedia of Polymer Science and Engineering*, John Wiley and Sons.

Examples of free radical acrylated resins (vinyl unsaturated resins) the are radiation (EB) curable include UCECOAT® 7689, UCECOAT® 7210 UCECOAT® 7674, UCECOAT® 7788, EBECRYL® 303, EBECRYL® 745, EBERCRYL® 8604, EBERCRYL® 1200, ADDITOL® VXW 6208, ADDITOL® VXW 6208/60, ADDITOL® XL 250 (Allnex USA Inc. Alpharetta GA); CN147, CN301, CN309, CN9014, SR238 B, SR259, SR420, and SR506 A (Arkema Inc., King of Prussia PA); Eastman EP Solvent (Eastman Chemical Company Kingsport TN); BYK-9077, Disperbyk-2150, and Disperbyk-2155 (BYK USA Inc. Wallingford CT); and SOLSPERSE 39000 (The Lubrizol Corporation, Wickliffe OH).

The active material particles can be any suitable active material particles. The active material particles can be cathode active materials comprising at least one selected from the group consisting of $LiCoO_2$, $LiNiO_2$, $LiMnO_2$, $LiMn_2O_4$, $LiFePO_4$, $LiMnPO_4$, $LiFe_xMn_{1-x}PO_4$, $LiNi_xMn_yCo_{1-x-y}O_2$, $Li_{1+x}Ni_yMn_zCo_{1-x-y-z}O_2$, $LiNi_xMn_yCo_zAl_{1-x-y-z}O_2$, $Li_{1+x}Ni_yMn_{1-x}Co_zO_2$, and $Cu_2ZnSn(S,Se)_4$. The active material particles can be anode active materials comprising at least comprising at least one selected from the group consisting of graphite, silicon, hard carbon and $Li_4Ti_5O_{12}$.

An electrode according to the invention includes a current collector having adhered thereto an electrode material comprising active material particles and electrically conductive particles covered by a resin. The active material particles, electrically conductive particles and resin are embedded within a radiation-cured polymer matrix.

A method for making a battery includes the above steps to form the electrode. Active material particles, radiation curable resin precursors, and electrically conducting particles are mixed together to create an electrode precursor mixture. The electrode precursor mixture is electrostatically sprayed onto a current collector to provide an electrode preform. The electrode preform is heated and calendered to melt the binder such that the radiation curable monomers surround the individual active particles and electrically conducting particles. Radiation is applied to the electrode preform sufficient to cure the radiation curable resin precursors into polymers to provide a finished first electrode. A second electrode, a separator, and an electrolyte are provided. The second electrode can be formed by a similar process or by a different process. The first electrode, second electrode, separator, and electrolyte are then assembled into a battery.

A system for making a battery includes an electrospray apparatus having a first electrode with a first polarity. A positioning apparatus for a current collector has a second electrode with a polarity opposite to the polarity of the first electrode. An electrode material source is provided for suppling a homogeneous mixture of active material particles, electrically conductive particles, and radiation curable resin precursors. The electrospray apparatus directs charged electrode material droplets to the current collector on the positioning apparatus to produce an electrode preform. A calender apparatus applies heat and pressure to the electrode preform. A radiation source supplies radiation to the electrode preform sufficient to cure the radiation curable resin precursors.

The mixing of the active material particles, radiation curable resin precursors and electrically conductive particles can be processed in the presence of or in the absence of solvents. Examples of appropriate solvents for mixing include ketone solvents, ether solvents, ester solvents, water, and mixtures of two or more thereof.

The method of mixing the active material particles, radiation curable resin precursors, and electrically conducting particles can vary. Examples of mixing methods include jet-milling, turbo-milling, roller milling, Spex milling, VEE mixing, mortar grinding, and consecutive processes of two or more thereof.

Electrostatic spraying has been used in the coating industry as a solvent-free processing technology and many suitable systems are available. The electrostatic spraying process consists of a powder pick-up and dispensing unit and an electrostatic spraying gun. Dry particles are charged by a spraying gun and travel towards the grounded metal surface under electrostatic forces. Electrostatic spraying offers the benefits of depositing onto a large surface area with high deposition rates that is easily scalable and does not require a solvent.

The active material particles, electrically conductive particles and radiation curable resin precursors are homogenously mixed together and fed into the spray gun. The spray gun will charge the particles and spray the particles out from the nozzle. The particles of the electrode precursor mixture will be sprayed onto the current collector and electrostatic forces will provide the adhesion of the particles to the current collector. The current collector can be pre-heated. Variables in dry powder mixing and electrostatic spraying such as particle dispersion, coating integrity, mechanical adhesion and loading uniformity can be observed to optimize process conditions.

FIG. 1 is a schematic diagram of an electrospray apparatus as used in the present invention for the electrostatic spray coating of composite electrode. The electrospray gun or head 11 charges the particles, and they are emitted from nozzle 12 of the spray gun 11. The charged particles 13 move toward the current collector 14 held by positioning apparatus 15.

Figure 2A:
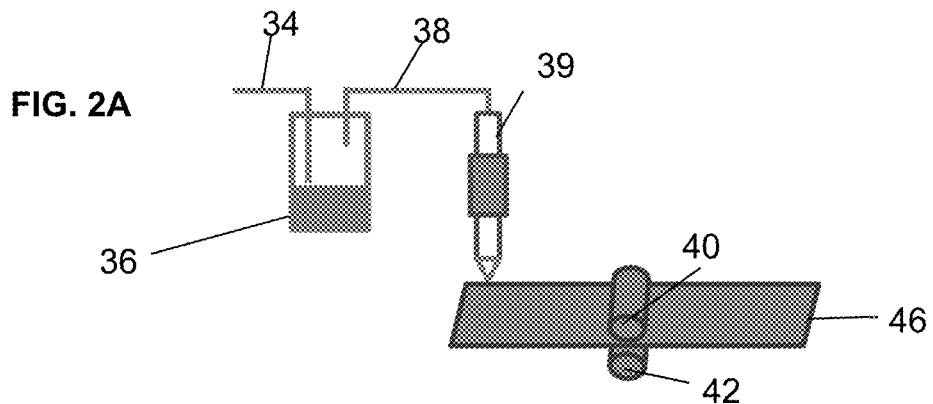
FIG. 2A is a schematic diagram of a calendering system.
Figure 2B:
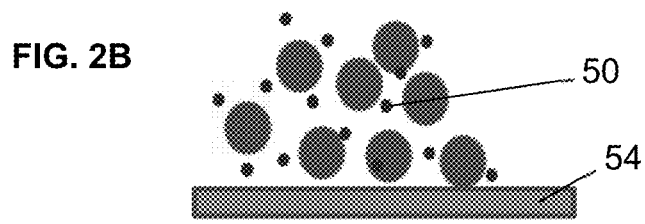
FIG. 2B is an as-deposited electrode preform.
Figure 2C:
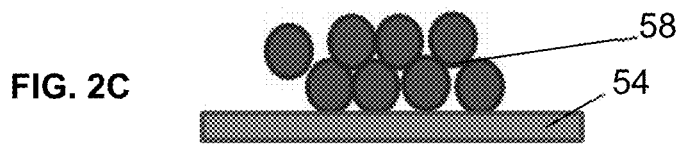
FIG. 2C is the electrode preform after heating and calendering.
Figure 3:
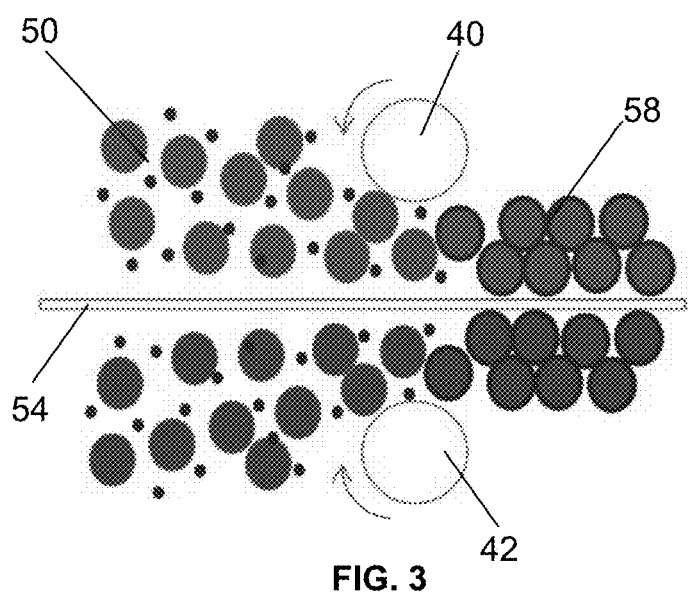
FIG. 3 is a schematic cross-sectional diagram of heating and calendering an electrode preform.

After the coating is sprayed onto the current collector, it will pass through a heated calendering roll to melt the binder which homogenously covers the lithium active particles and carbon black particles. The calendering will also promote the adhesion of the coating to the current collector. Calendering temperature and pressure can be controlled for the electrostatic spray coating. FIG. 2 is a schematic diagram of a calendering system (FIG. 2A); an as-deposited electrode preform (FIG. 2B); and the electrode preform after heating and calendering (FIG. 2C). An inlet 34 supplies precursor materials to the container 36 and an outlet 38 conveys these materials to electrospray head 39. The electrospray head 39 deposits the materials to provide electrode preform 46. Calender rollers 40 and 42 apply heat and pressure to the electrode preform 46. The heat and pressure is applied to the as deposited materials 50 (FIG. 2B) on the current collector 54, and forms densified electrode preform 58 on the current collector 54 (FIG. 3).

After the calendering operation is complete the composite electrode is radiation cured using UV and/or electron beam radiation which polymerizes and cross-links the binder thus providing cohesion and adhesion of the electrode materials. Radiation curing uses solvent-free compositions that have low emissions (VOCs) and are recognized by federal, state and local governments as being a more desirable technology.

Radiation curing offers significant process energy savings, is ultra-high speed, and utilizes much more compact equipment than conventional drying ovens such that much less plant floor space is required. Radiation curing can be accomplished in a single step for less than a second. The dose can be optimized according to electrode integrity and performance.

Figures 4A, 4B:
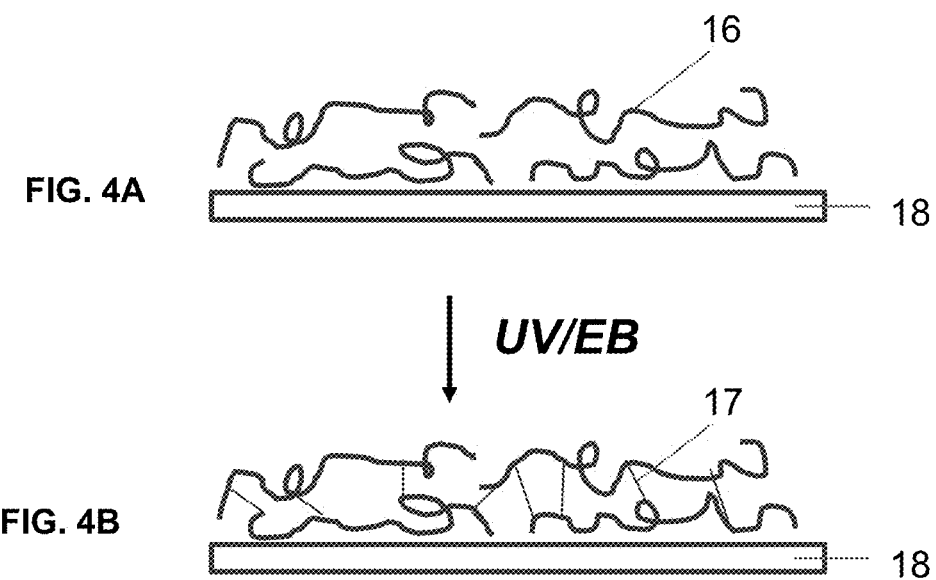
FIGS. 4A-4B are schematic diagrams of a resin curing process according to the invention.
Figures 5A, 5B:
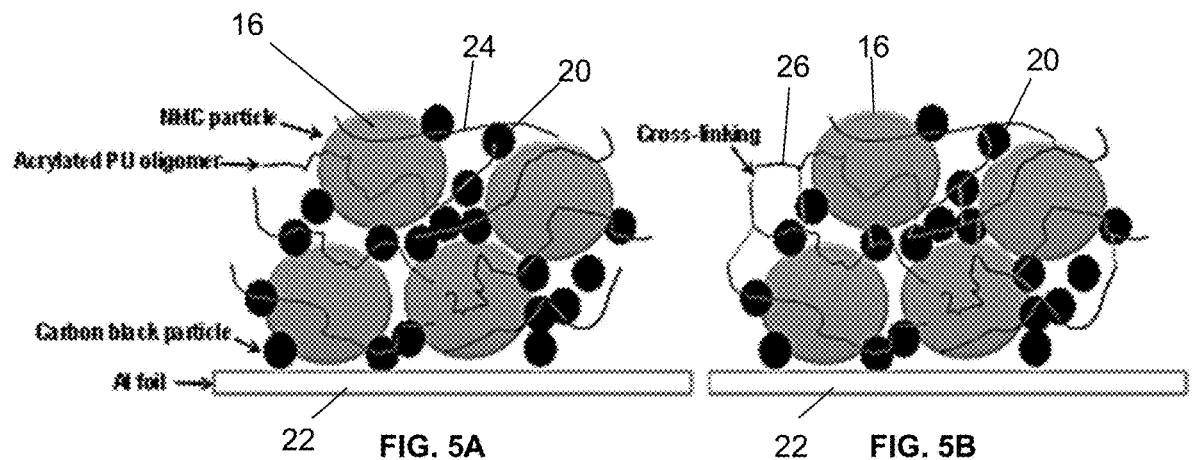
FIGS. 5A-5B are magnified schematic diagrams of a resin curing process according to the invention.

As shown in FIGS. 4A-B, radiation curing employs resin precursors such as polymers/oligomers with low molecular weight 16 (FIG. 4A) which are subsequently cross-linked into high molecular weight polymers 17 (FIG. 4B) to the current collector 18 with high cohesive and adhesive strength. Conventional slot-die coated coatings using radiation curable binders show comparable performance with industrial standard coatings. The process is shown in more detail in FIG. 5 A-B, where the active material particles 16, electrically conductive particles 20, and radiation curable resin precursors 24 are deposited on the current collector 22 (FIG. 5A). After application of radiation cross-linking 26 appears and the resin precursors 24 are converted into resin (FIG. 5B).

Figure 6:
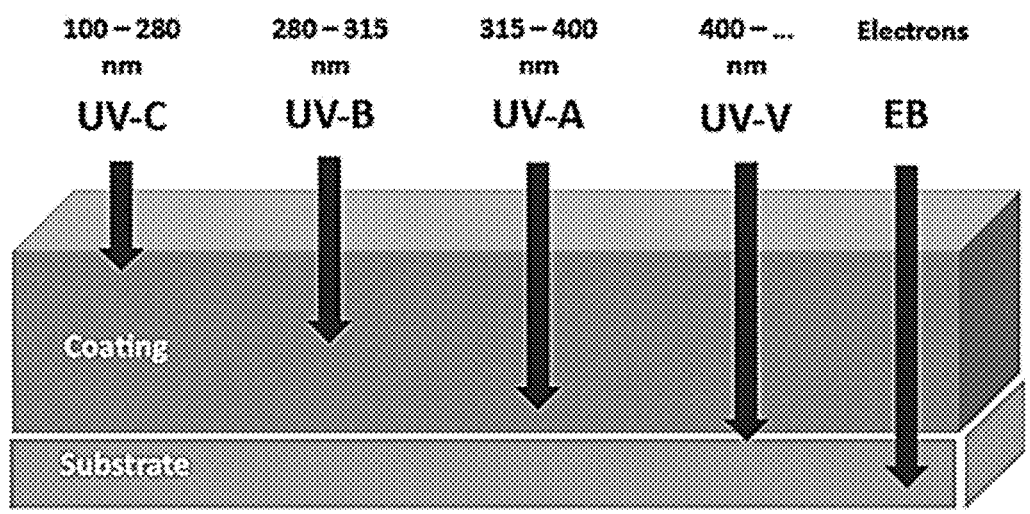
FIG. 6 is a schematic diagram illustrating the application of different radiation sources for the curing step.

The selection between UV curing and EB curing can depend on process characteristics. Different parts of the UV spectrum can penetrate to different depths of the coating. FIG. 6 is a schematic diagram illustrating the application of radiation and penetration. As shown the penetration depth increases from UV-C (100-280 nm), UV-B (280-315 nm), UV-A (315-400 nm), and UV-V (400-700 nm). EB provides the greatest depth of penetration. The right photoinitiator choice will initiate the reaction in the entire coating. EB does not need a photoinitiator. The penetration depth of UV curing is limited by the wavelength of UV. Single-pass curing of thick electrodes (>150 microns) is only possible using EB. One example of a suitable EB apparatus is the PCT/Comet EBLab200 with 200 keV (COMET Technologies USA Inc., Davenport Iowa), self-shielded, and $N_2$ inerted.

Figure 7:
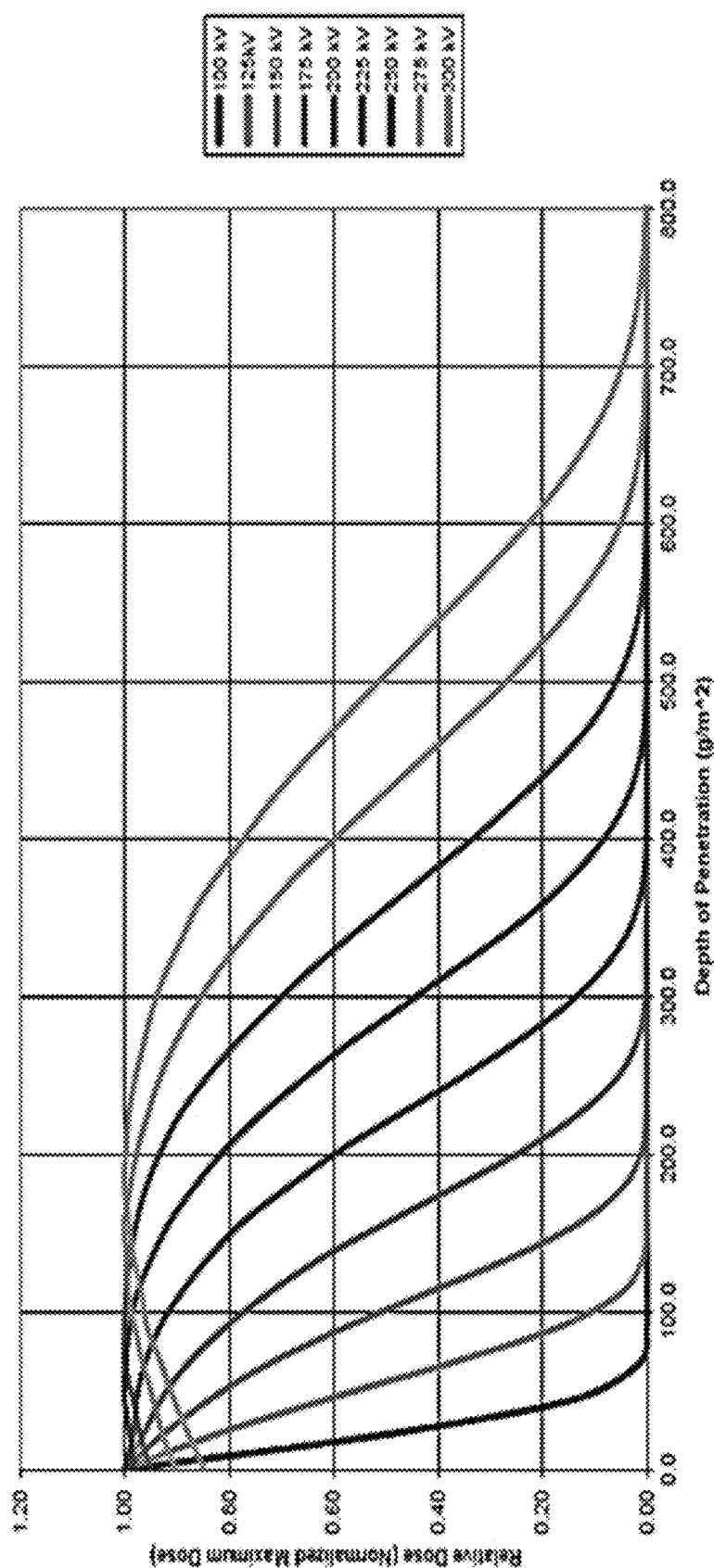
FIG. 7 is a plot of relative dose vs. depth of penetration $(g/m^2)$.

The penetration possible with EB is shown in FIG. 7. FIG. 7 is a plot of relative dose vs. depth of penetration ($g/m^2$). The penetration of EB is related to the accelerating voltage and the density of the processed material. Higher voltage enables deeper penetration while denser material reduces the depth of penetration. For Li-ion battery coatings (12.5-25 $mg/cm^2$), complete penetration can be achieved with 200-300 kV.

Figure 8:
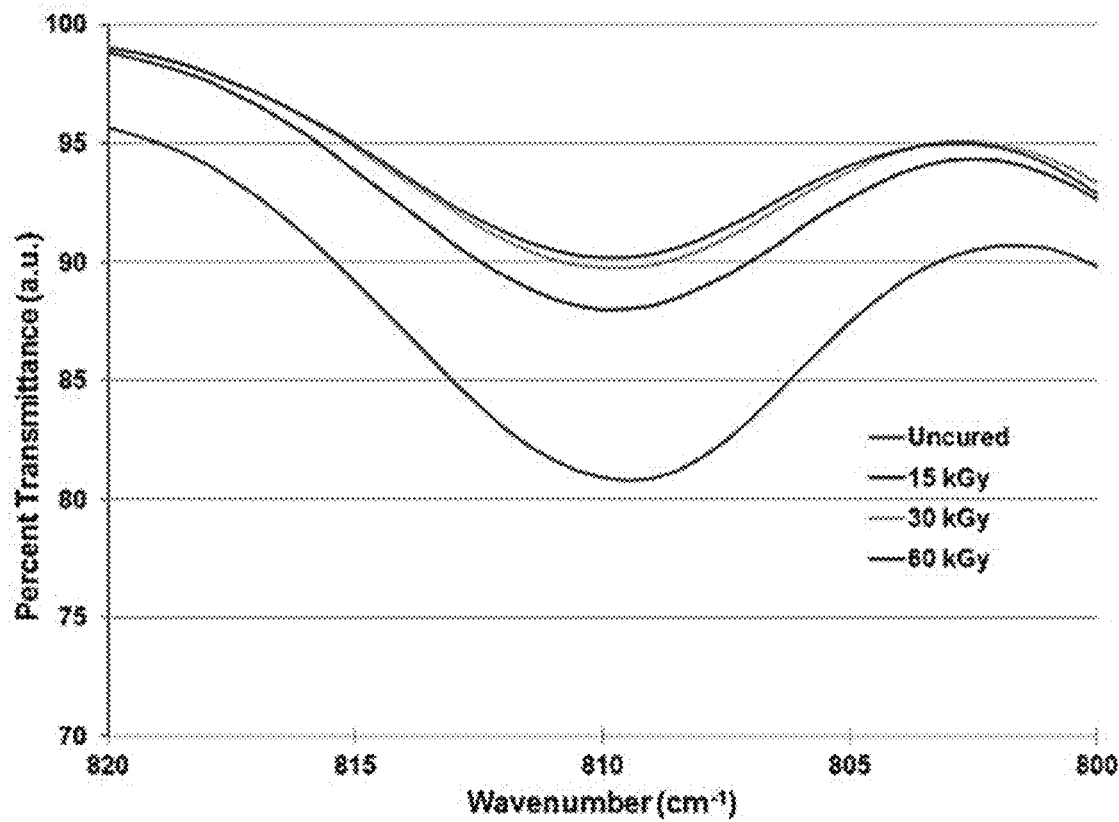
FIG. 8 is a plot a percent transmittance (a.u.) vs. wavenumber $(cm^{-1})$.

Resin cross-linking is influenced by the energy and wavenumber of the radiation. FIG. 8 is a plot a percent transmittance (a.u.) vs. wavenumber (cm$^{-1}$). Pure resin films were cured under different doses: 15 kGy, 30 kGy, 60 kGy. The disappearance of C=C double bonds is due to the cross-linking. The intensity decreased from 0 kGy to 30 kGy and showed very little change after 30 kGy. 30 kGy was chosen for this work since a high degree of cross-linking degree was achieved.

The radiation curing, and heating and calendering, can be exchanged in order. The calendering step can occur before or after the radiation curing step, where in the case of after curing the radiation curable resin precursors will be joined together as a resin when calendered. The heating step can occurring during calendering, as by hot rollers, or before or after the calendering step. The heating step in some cases can be optional if for example the radiation step imparts sufficient heating.

EXAMPLE

Figure 9:
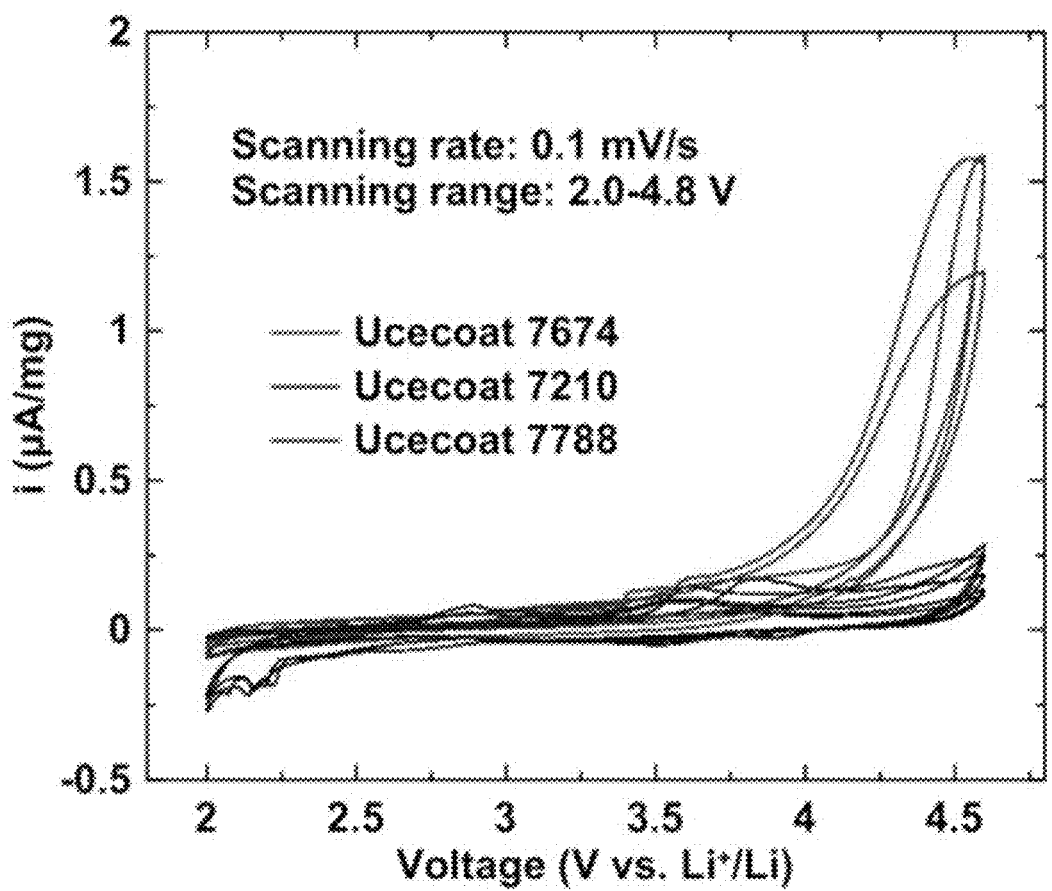
FIG. 9 is a plot of i ($\mu$A/mg) vs. Voltage (V vs. $Li^+/Li$).

The electrochemical stability of EB-cured resins was determined. FIG. 9 is a plot of i (μA/mg) vs. Voltage (V vs. Li+/Li) for such resins. As shown in FIG. 9, at a scanning rate of 0.1 mV/s and a scanning range of from 2 V to 4.8 the Ucecoat (Allnex, Frankfurt DE) 7674 and 7788 resins show no reactivity towards lithium in the scanned range. The peak current at 4.5 V for the Ucecoat 7210 resin is only 1.5 μA/mg. The Ucecoat 7210 is considered inactive.

Figure 10:
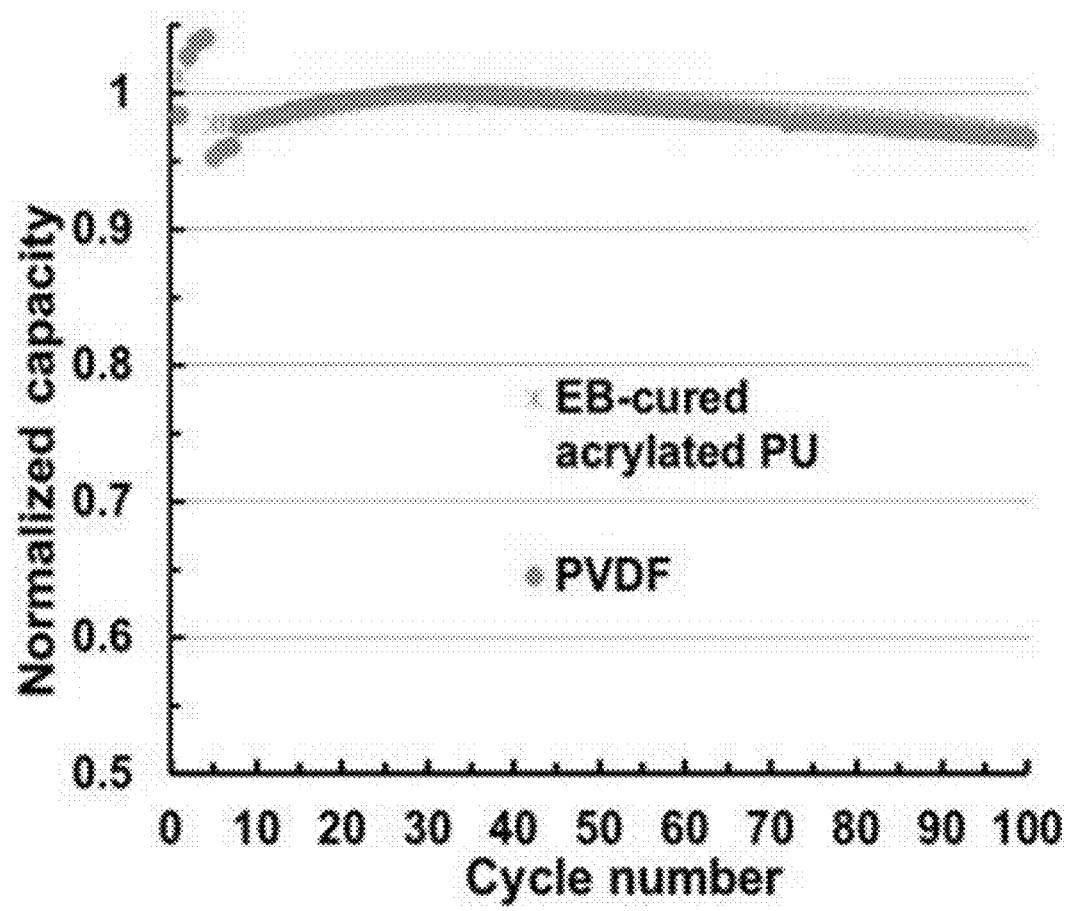
FIG. 10 is a plot of normalized capacity vs. cycle number for EB-cured acrylated PU and PVDF.

The invention provides good cycling performance aqueous formulation. FIG. 10 is a plot of normalized capacity vs. cycle number. The NMC532 cathode with PVDF as the binder shows excellent cycling stability with 96.7% capacity maintained after 100 cycles. Similar cycling performance is observed for the NMC532 cathode using EB-cured acrylated PU as the binder with 97.1% capacity maintained after 100 cycles.

5 dry powders were prepared for the electrostatic spraying method. NMC/CB/Resin 87/5/8 wt %. These are shown in Table 1 below (PA50, Keyland Polymer, Cleveland, OH):

TABLE 1

| Sample | Resin | Photoinitiator | Solvent | Note |
|---|---|---|---|---|
| A | Ucecoat | N | No water | EB curing |
| B | Ucecoat | N | Water | EB curing |
| C | Ucecoat | Y | Water | UV curing Keyland |
| D | PA50 | N | Acetone | EB curing |
| E | PA50 | Y | Acetone | UV curing Keyland |

Samples B, C, D, and E were prepared from a slurry and then dried. For Sample A the resin is around 40 wt % in water. The solid content is ~90 wt %. The materials were then roller milled with balls, ground and then dried.

Figure 11:
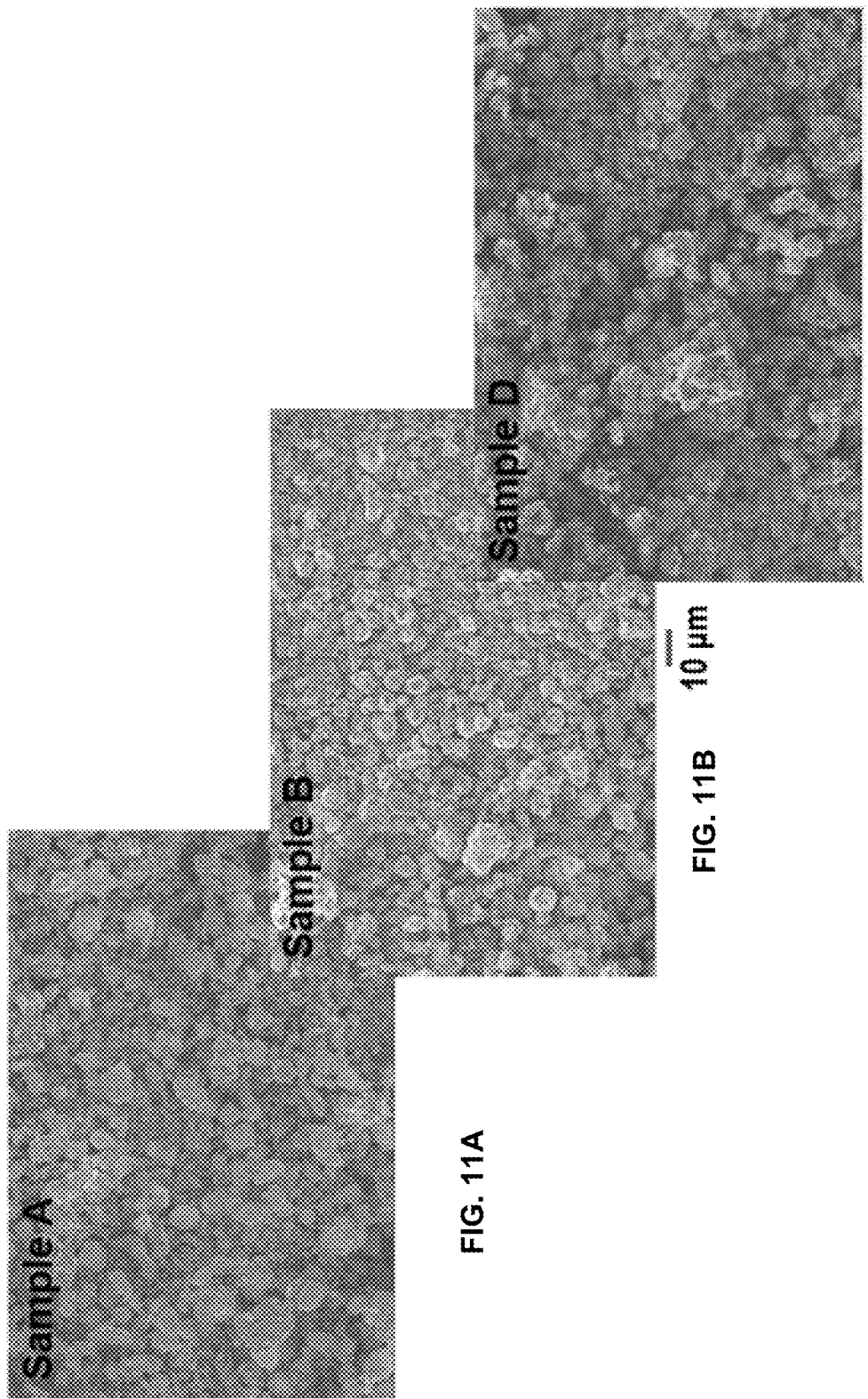
FIGS. 11A-11C are SEM images of electrospray coatings of Sample A (FIG. 11A); Sample B (FIG. 11B); and Sample D (FIG. 11C).

Good mixing was demonstrated for 90 wt % solid powder. This is shown in FIGS. 11A, 11B and 11C. FIG. 11 is an SEM of electrosprayed coatings of Sample A (FIG. 11A); Sample B (FIG. 11B); and Sample D (FIG. 11C). No difference was observed for sample A and B. This demonstrates that the resin was well dispersed in the NMC and carbon black mixtures.

A second spraying trial with the same samples as above was conducted under the conditions of powder spraying: power set –10 μA; powder flow set—1.36; atomization set—0.85. Upon spraying, the spray nozzle was approximately one inch from the substrate. The areal loading was 5-6 mg/cm$^2$. Sample C and E were UV irradiated with a 300 W V-bulb microwave lamp. The peak irradiance was about 4400 mW/cm$^2$. All the powders were well attached to the substrate. All the samples were calendered and adhesion was improved. Samples C and E were assembled into coin cells. Samples A, B and D were EB cured.

Figure 12:
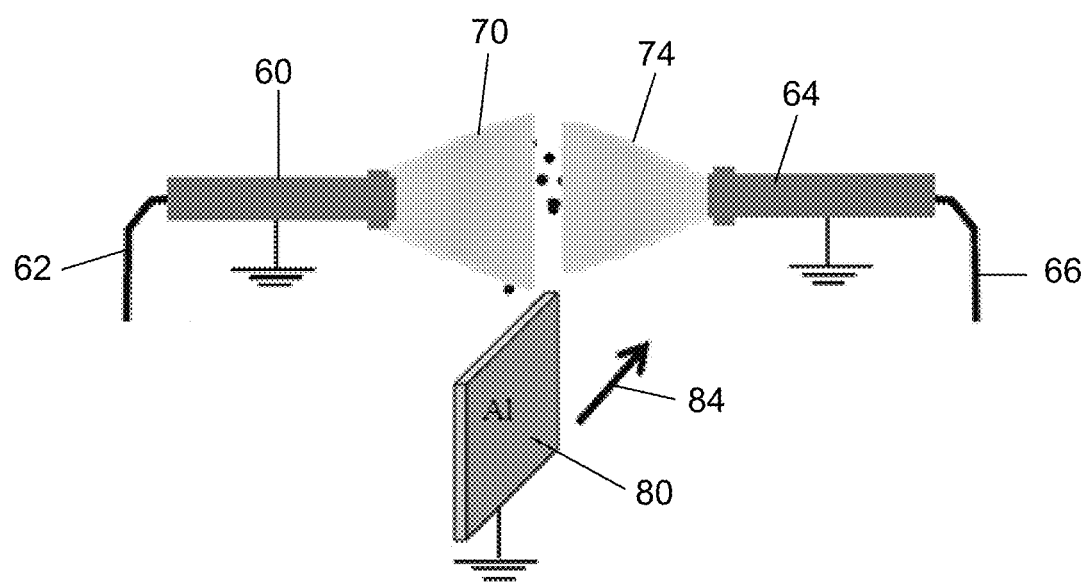
FIG. 12 is a schematic diagram of a two-side electrospray apparatus.

Electrostatic spray coating on two sides of a current collector is possible. This is shown in FIG. 12. One two-sided UV system at 60 m/m has output of four conventional coating lines at 30 m/m. The system has an electrospray head 60 with material supply 62 and produces material plume 70, and a second electrospray head 64 with a second material supply 66 and produces a second material plume 74. The current collector 80 is moved by the positioning apparatus in the direction of arrow 84, whereupon one side of the current collector 80 is coated by the plume 70 and the other side of the current collector 80 is coated by the plume 74.

The invention provides significant process energy savings, high speed, and utilizes much more compact equipment than conventional drying ovens. Instant curing improves output and reduces the process footprint. Instant UV curing reduces space, capital and operating costs, although electron beam curing is preferred for penetration purposes. The toxic solvent (NMP) in conventional processing method is also completely removed from this invention. The invention also eliminates the slurry preparation and slot-die coating steps.

The invention can be embodied in other forms without departing from the spirit or essential attributes thereof. Reference should therefore be made to the following claims to determine the scope of the invention.

We claim:

1. An electrode preform comprising:
   active material particles, wherein the active material particles are cathode active materials;
   electrically conductive particles;
   a cationic photoinitiator; and
   a radiation-cured resin comprising a polymer matrix, wherein the active material particles and the electrically conductive particles are surrounded by and embedded within the polymer matrix;
   wherein the electrode preform is absent of solvents, and does not emit volatile organic compounds.

2. The electrode preform of claim 1, wherein the radiation-cured resin is a free radical acrylated resin.

3. The electrode preform of claim 1, wherein the cationic photoinitiator comprises a compound selected from the group consisting of a diaryliodonium salt, a triarylsulfonium salt, and combinations thereof.

4. The electrode preform of claim 1, wherein the radiation-cured resin further comprises a toughener.

5. The electrode preform of claim 4, wherein the toughener comprises a material selected from the group consisting of a polysulfone, a polyetherimide, a nylon, a polyimide, a polyamideimide, a poly(arylene ether), a polyester, a polyarylate, a polycarbonate, a polyurethane, and combinations thereof.

6. The electrode preform of claim 1, wherein the radiation-cured resin further comprises a flexibilizer.

7. The electrode preform of claim 1, wherein the electrically conductive particles comprise a material selected from the group consisting of carbon black, graphene, carbon nanotubes, and combinations thereof.

8. The electrode preform of claim 1, wherein the cathode active materials comprise a material selected from the group consisting of $LiCoO_2$, $LiNiO_2$, $LiMnO_2$, $LiMn_2O_4$, $LiFePO_4$, $LiMnPO_4$, $LiFe_xMn_{1-x}PO_4$, $LiNi_xMn_yCo_{1-x-y}O_2$, $Li_{1+x}Ni_yMn_zCo_{1-x-y-z}O_2$, $Li_{1+x}Ni_yMn_{1-x}Co_zO_2$, $Cu_2ZnSn(S,Se)_4$, and combinations thereof.

9. The electrode preform of claim 1, wherein the active material particles comprise anode active materials.

10. The electrode preform of claim 9, wherein the anode active materials comprise a material selected from the group consisting of graphite, silicon, hard carbon, $Li_4Ti_5O_{12}$, and combinations thereof.

11. The electrode preform of claim 1, wherein the electrode preform is formed in the absence of solvents.

12. An electrode comprising:
   a current collector: and
   the electrode preform of claim 1.

13. The electrode of claim 12, wherein the electrode preform is electrostatically adhered to the current collector.

14. An energy storage device comprising:
   the electrode of claim 12;
   a second electrode;
   a separator disposed between the electrode and the second electrode;
   an electrolyte; and
   a housing, wherein the electrode of claim 12, the second electrode, the separator and the electrolyte are disposed within the housing.

15. The energy storage device of claim 14, wherein the energy storage device is a battery.

16. The energy storage device of claim 14, wherein the energy storage device maintains about 97% of its initial capacity after at least 100 cycles.

* * * * *